Feb. 26, 1963  W. E. TRAGERT ET AL  3,078,553
SINTERED ALUMINUM COMPOSITION
Filed Oct. 15, 1959  2 Sheets-Sheet 2
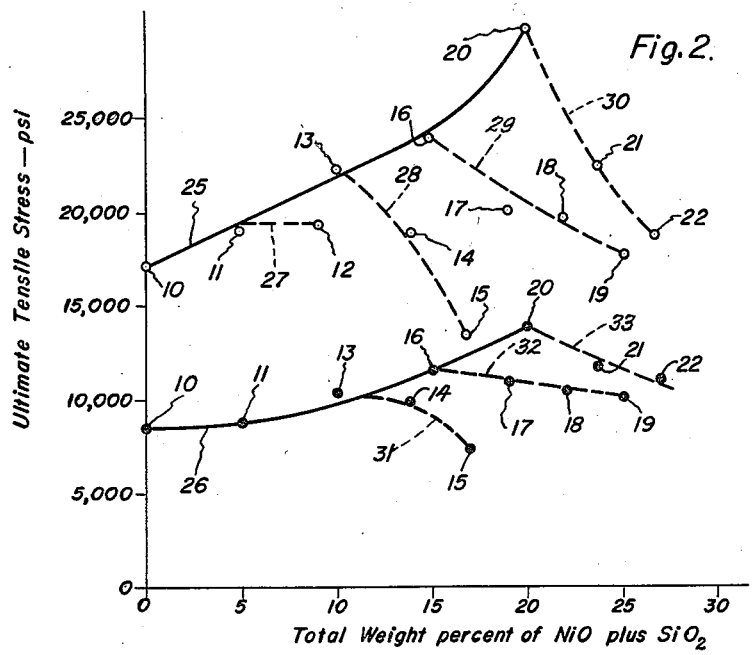
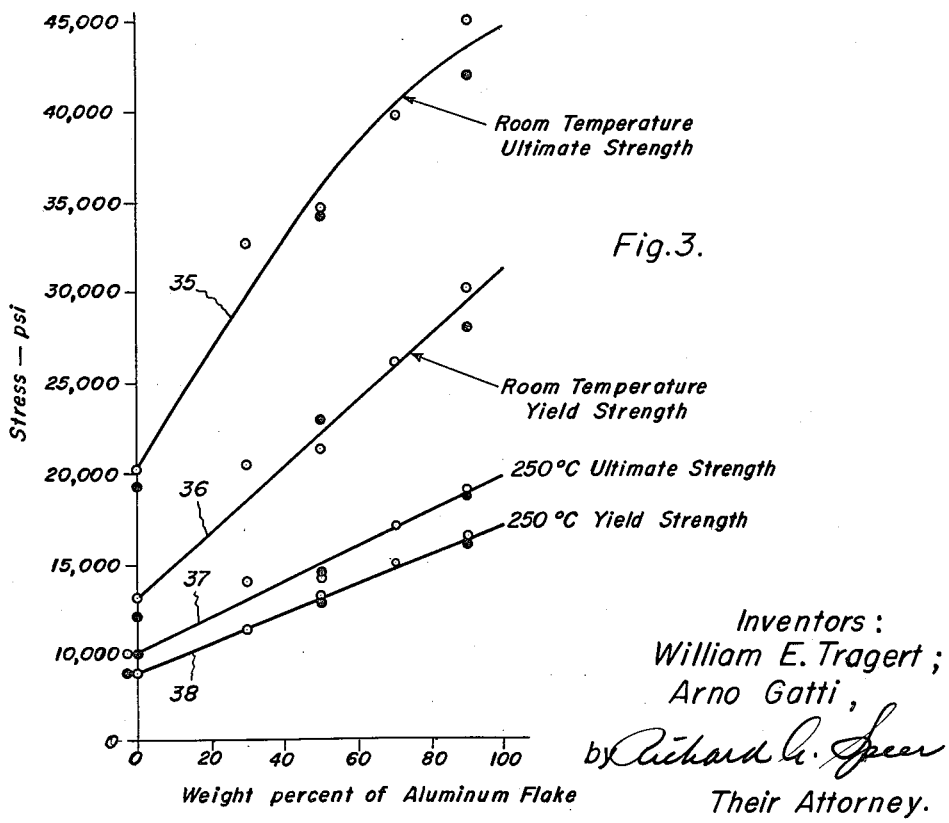
Inventors:
William E. Tragert;
Arno Gatti,
by Richard A. Speer
Their Attorney.

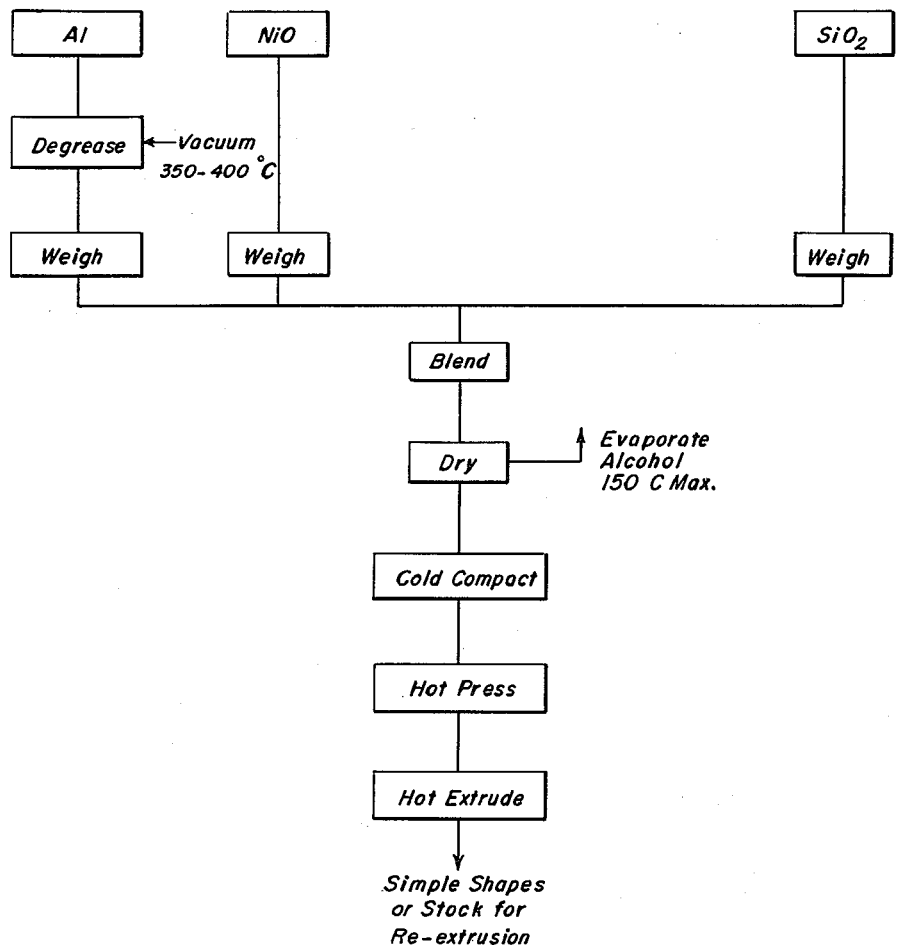

3,078,553
SINTERED ALUMINUM COMPOSITION

William E. Tragert, Scotia, and Arno Gatti, Schenectady, N.Y., assignors to General Electric Company, a corporation of New York
Filed Oct. 15, 1959, Ser. No. 846,686
4 Claims. (Cl. 29—182.5)

This invention relates to sintered powder metal bodies and more particularly to such bodies composed principally of aluminum particles containing a dispersion of finely divided particles to achieve greater strength and increased resistance to corrosion in high temperature water than bodies made solely of aluminum particles and to obtain a material of comparatively lower nuclear cross-section.

This application is a continuation-in-part of copending application Serial No. 698,368, filed November 25, 1957, now abandoned, and assigned to the same assignee as the present invention.

Commercially pure aluminum in the form of sheet, plate, bar, rod and wire is one of the most widely used engineering materials. This material, commonly designated as "2S Alloy," is composed of at least 99 percent aluminum. As is well known, the room temperature mechanical properties of this material may be substantially improved by cold working, resulting in work or strain hardening of the material. However, as the temperature of these work-hardened materials is raised from room temperature to about 400 to 500° F., or about 200 to 260° C., their strength progressively declines until, at the higher temperatures, the strengthening effect of cold work is not observable.

It has been found that structural bodies having commercially pure aluminum as their sole metallic constituent may be formed by powder metallurgy techniques and have much higher mechanical properties than the conventionally formed, commercially pure aluminum bodies, both at room temperature and at elevated temperatures. This material, known in the art as "SAP" (sintered aluminum product), is conventionally composed of relatively fine particles of commercially pure aluminum, each particle being surrounded by or covered by an oxide film, which particles are compacted together to form a body of the desired configuration, sintered and worked to form a coherent body of high strength. SAP bodies are thus composed principally of metallic aluminum with a minor amount of aluminum oxide dispersed therethrough, resulting from the rupture of the oxide films under pressure, and are characterized by comparatively high mechanical properties. The mechanical properties available in the sintered bodies can be varied somewhat by using either a flake or an atomized powder, the flake material giving maximum strengths approximately 50 to 60 percent that of the aluminum flake, as indicated more fully later.

While commercially pure aluminum in the conventional wrought or cast form and in the form of SAP bodies has excellent resistance to corrosion by atmospheric gases at temperatures up to nearly its melting point, liquid water at temperatures above 200° C. rapidly and drastically attacks these materials, quickly forming a non-adherent and hence non-protective hydrated aluminum oxide. This lack of resistance to corrosion by water at high temperatures has, prior to this invention, precluded the use of aluminum and sintered aluminum product as structural materials in such an environment, for example, in nuclear applications as cladding materials for fuel elements where aluminum and the aluminum alloys would normally be of use due to their low nuclear cross-section.

It is therefore a principal object of this invention to provide a composite material composed principally of metallic aluminum having high mechanical properties at elevated temperatures and which is virtually impervious to corrosion by liquid water.

It is another object of this invention to provide a composite of aluminum powder containing added powders rendering the final body resistant to corrosion in high temperature water and having a low nuclear cross-section.

Other objects and advantages will be in part obvious and in part explained by reference to the accompanying specification and drawings.

In the drawings, FIG. 1 is a flow diagram outlining the process for producing sintered bodies according to the present invention;

FIG. 2 is a graph showing the effect of additions of $SiO_2$ and NiO to sintered aluminum bodies both at room and at elevated temperatures, the solid line curves showing the effects of $SiO_2$ alone and the broken line curves the combined effects of $SiO_2$ and NiO; and FIG. 3 is a graph showing the effect of atomized and flake aluminum powder on the ultimate strength and yield strength of bodies produced with various amounts of these two constituents.

Briefly stated and in accordance with one aspect of this invention, it has been discovered that sintered bodies formed by compacting mixtures of finely divided aluminum, together with $SiO_2$ and NiO, or aluminum phosphate particles have superior corrosion resistance in high temperature water or high temperature water-steam environments and have increased mechanical properties rendering them particularly suitable for use in nuclear applications.

Generally, the process for preparing the sintered bodies comprises blending predetermined quantities of the powder ingredients and subsequently compacting and firing the blended powders into a rigid body. The aluminum powder may be used in either atomized form in which the powders are essentially spherical with nominal diameters ranging from 5 to 44 microns or in flake powder form in which the aluminum platelets range from 0.15 to 1.0 micron thick and have diameters of 1 to 10 microns. The natural oxidation film on the particles is about 0.03 micron thick on the atomized powders, yielding $Al_2O_3$ contents from 0.5 to 1.5 weight percent. The normal oxidation film on flake materials is about 0.01 micron, giving $Al_2O_3$ contents of from 3 to 13 weight percent, depending on the flake thickness.

Due to the fact that the aluminum flake powders are made by a ball milling or stamping operation of atomized powder with stearic or oleic acid as a lubricant to prevent agglomeration of the flakes, a degreasing operation is required prior to use of the powder in the process. Degreasing of the flakes can be accomplished by heating to 400° C. in a vacuum, as is well known in the art.

Referring to the flow sheets shown in FIG. 1 of the drawings to illustrate how a sample composition is prepared, aluminum powder or flake is degreased in a vacuum at a temperature of from 350 to 400° C. and then combined with weighed amounts of NiO and $SiO_2$. If atmoized aluminum powder is used rather than flake aluminum, the degreasing operation need not be carried out.

Following weighing of the three ingredients, a blending operation is effected in which a slurry is prepared by fluidizing the powders in denatured ethyl alcohol, although the particular blending medium used is not critical and other fluids may be substituted for alcohol. The amount of fluidizing vehicle required to form a slurry varies with the aluminum powder particle size; for example, in the present instance, 900 grams of atomized powder required 700 milliliters of alcohol while 100 milliliters were used for the metal oxide additives. When flake particles are used, three milliliters of alcohol are required for each gram of material. Blending of the slurries may be satisfactorily accomplished with a mixing device having a bladed agitator operating at high speeds or with any one of several types of mechanical agitators.

Following blending, the alcohol is evaporated by heating the powder to a maximum temperature of 150° C. until dry. The slurry should be dried in a receptacle which will not contaminate it, such as the aluminum foil trays used in preparing the present mixtures. One problem present at this stage is that of maitaining the metal particles apart from the atmosphere, since they are highly pyrophoric and will burn if heated to too high a temperature during the drying operation. Upon completion of drying, the powders are isolated from the atmosphere in sealed containers to prevent absorption of moisture from the atmosphere.

As indicated in FIG. 1, a cold compaction follows the drying step, at which time the powders are compressed into compacts at pressures ranging from 20,000 to 50,000 pounds per square inch. This compaction is effected at room temperature with densities ranging from 75 to 85 percent of theoretical for flake particles, and from 85 to 90 percent of theoretical for atomized powders being obtained.

The succeeding step in the process is that of hot pressing, at which time the cold compacts are pressed at even higher pressures, specifically, 50,000 to 100,000 p.s.i. while subjected to temperatures on the order of 560 to 600° C. This hot pressing step may be omitted if desired, since bodies having essentially the same properties can be obtained through use of cold pressing only. The pressed billets may then be hot extruded at temperatures of from 550 to 600° C. to form simple shapes or stock for use or subsequent re-extrusion to smaller sizes.

Compacts of atomized aluminum powder containing $SiO_2$ and NiO in varying amounts were prepared according to the process just outlined and tested for corrosion resistance and for mechanical strength. The compositions are listed in weight percent in the following Table I and the ultimate tensile stress for each body determined. The stresses are shown in FIG. 2 of the drawings and the individual samples are numbered there as listed in Table I.

Table I

| $SiO_2$ | NiO | Al | Drawing No. |
| --- | --- | --- | --- |
| 0 | 0 | 100 | 10 |
| 5 | 0 | 95 | 11 |
| 5 | 4 | 91 | 12 |
| 10 | 0 | 90 | 13 |
| 10 | 4 | 86 | 14 |
| 10 | 7 | 83 | 15 |
| 15 | 0 | 85 | 16 |
| 15 | 4 | 81 | 17 |
| 15 | 7 | 78 | 18 |
| 15 | 10 | 75 | 19 |
| 20 | 0 | 80 | 20 |
| 20 | 4 | 76 | 21 |
| 20 | 7 | 73 | 22 |

The compacts of the compositions listed in Table I were subjected to testing in which the ultimate tensile stress in pounds per square inch was determined both at room temperature and at 250° C. The results of the tests conducted are shown in FIG. 2 of the drawings. The solid line curves 25 and 26 clearly indicate that the addition of $SiO_2$ alone increases the ultimate tensile stress which the material is capable of withstanding. The effect of adding NiO to the $SiO_2$ is indicated by the broken line curves 27—33, which illustrate that the NiO acts to decrease the ultimate stress which the bodies are capable of withstanding. However, the NiO additions are valuable in providing acceptable corrosion resistance in high temperature water environments.

The relative effect of NiO and $SiO_2$ on the tensile strength of powdered aluminum products decreases as the particle size, or thickness, of the aluminum powder decreases. This is probably due to the finer dispersion of the $Al_2O_3$ film. It is expected that in materials made from aluminum flake powders, the strengthening effect of NiO and $SiO_2$ can be ignored and that the decrease in ductility due to these additives will be proportional to their volume percent present. It is understood that the yield strength of aluminum powder extrusions made from degreased flake powders increases directly with the square root of the reciprocal of the average flake thickness and that the weight percent of the $Al_2O_3$ present is not as important as the flake thickness in achieving high strength values. The strength of the aluminum cermets of the present application can be increased by changing the particle size of the aluminum powders or by mixing the atomized and flake powders.

The effect of increasing particle size on the tensile stress which compacted bodies can withstand is clearly shown in FIG. 3 of the drawings where stress is plotted against weight percent of aluminum flake for compositions containing 5 percent $SiO_2$, 4 percent NiO and 8 percent $SiO_2$, 2 percent NiO. Curve 35 indicates the room temperature ultimate strength of compacts of both compositions (8 $SiO_2$—2 NiO and 5 $SiO_2$—4 NiO) while the curve 36 indicates the room temperature yield strength of the samples. The white plot points represent the ultimate and yield strengths of samples having the composition 5 weight percent $SiO_2$, 4 weight percent NiO, remainder aluminum, and the black plot points represent samples containing 8 weight percent $SiO_2$, 2 weight percent NiO, remainder aluminum. It is quite obvious from these two curves that the strength of the materials increases drastically as the weight percent of the aluminum flake is increased from zero to the point where it constitutes the entire bulk of the body. For example, the material consisting of 8 percent $SiO_2$, 2 percent NiO and the remainder aluminum, had an ultimate strength of about 20,000 p.s.i. when only atomized powder was used and an ultimate strength of about 44,000 p.s.i. when all flake aluminum was used. A similar ratio in increase in strength is true of the other compositions and, as clearly shown by curves 37 and 38, the same upward trend in strength existed when the bodies were tested at 250° C.

There are two basic properties that an aluminum cladding material must possess before it is suitable for nuclear application in a boiling water reactor: (1) mechanical strength and (2) corrosion resistance to water and steam-water environments, as already mentioned. The former requirement has been accomplished through the use of aluminum powder products where strengthening is attained by a dispersion-hardening type mechanism. The latter requirement was more difficult to fulfill since aluminum corrodes and erodes at temperatures slighty above 200° C. The use of NiO as an added material to the aluminum powders resulted in an increase in corrosion resistance but it also increased the nuclear cross-section of the material, thereby decreasing its applicability for nuclear use. Also, the NiO resulted in a decrease in the mechanical properties of the sintered compact, rendering it unsuitable for cladding applications. A dispersion of $SiO_2$ was unexpectedly found to both improve the nuclear cross-section and to improve the mechanical properties while retaining the corrosion-resisting properties of aluminum powder bodies containing NiO.

With regard to the corrosion resistance of the materials, tests were run on mixed oxide materials, that is, aluminum containing combined amounts of NiO and $SiO_2$, and it was found that at up to 900 hours at 300° C., there was little composition sensitivity in static tests. The corrosion ranged between 0.2 and 0.6 mils per year, which is extremely good corrosion resistance. Dynamic corrosion tests were also undertaken to determine the resistance of the material to corrosion when flowing mediums were present. In these tests, several compositions were investigated, and these are set forth in Table II together with the testing conditions and results.

The temperature of the corroding water was kept at 300° C. and the velocity was either 6 or 12 feet per second, depending upon the location of the article being tested. A pH of 7.0 was maintained during the course of testing so that the acidity or basicity of the material exerted very little or no effect on the corrosion rates. All of the samples tested showed a moderate weight increase, indicating good resistance to corrosion. The film thicknesses set forth in the following table indicate the corrosion rate of the samples, since the penetration rate is equal to about one-half the film thickness.

*Table II*

| Alloy | | No. of Samples | Water Condition | | Velocity (ft./sec.) | | Film Thickness (mils) | |
|---|---|---|---|---|---|---|---|---|
| $SiO_2$ | NiO | | Water | Steam-Water | 6 | 12 | 286 hrs. | 707 hrs. |
| 5 | 2 | 3 | | x | x | | 0.94 | |
|   |   | 5 | | x | x | | 1.02 | |
|   |   | 3 | x | | x | | 1.04 | |
| 5 | 4 | 1 | x | | x | | 0.69 | |
|   |   | 3 | x | | x | | | 1.56 |
|   |   | 2 | | x | x | | | 1.53 |
|   |   | 1 | | x | | x | | 1.82 |
| 8 | 2 | 3 | x | | x | | | 1.48 |
|   |   | 1 | | x | x | | 1.03 | |
|   |   | 2 | | x | x | | | 1.38 |
|   |   | 2 | | x | | x | | 1.45 |
|   |   | 3 | | x | x | | | 1.35 |
|   |   | 2 | | x | x | | | 1.21 |
|   |   | 1 | | x | | x | | 1.12 |
| 8 | 4 | 1 | x | | x | | 0.76 | |
|   |   | 4 | x | | x | | | 1.55 |
|   |   | 2 | | x | x | | | 1.38 |
|   |   | 1 | | x | | x | | 1.56 |

It will be seen that no data is presented in Table II for the SAP material which did not contain NiO. This is due to the fact that after only about 10 hours or less at 300° C. the conventional SAP material was attacked by the liquid water to the extent that the specimens lost their physical integrity and substantially disintegrated into a powdery hydrated alumina.

Additional samples were prepared according to the process of the invention and tested in flowing water at 300° C. for protracted periods of time. The approximate corrosion rates for these materials were determined and are listed in the following Table III:

*Table III*

| Composition: | Corrosion rate (mils/year) |
|---|---|
| 10% $SiO_2$ | 10 to 20 |
| 20% $SiO_2$ | 10 |
| 25% $SiO_2$ | >10 [1] |
| 25% $SiO_2$+2% NiO | Spalls |
| 20% $SiO_2$+2% NiO | 25 |
| 15% $SiO_2$+2% NiO | 25 |
| 10% $SiO_2$+2% NiO | 40 |
| 10% $SiO_2$+4% NiO | 3 to 5 |
| 10% $SiO_2$+6% NiO | 2 to 3 |
| 4% $Fe_2O_3$+3% $SiO_2$ | 40 |
| 7% $Fe_2O_3$+10% $SiO_2$ | 15 |
| 10% $AlPO_4$ | 10 |

[1] Surface tended to spall, making exact rate difficult to determine.

From the data obtained, it would appear that the best resistance to corrosion and the highest mechanical properties are attained in the materials of this invention which contain from about 2 to 12 percent of an oxide of a ferromagnetic metal, preferably NiO, combined with 5 to 20 percent $SiO_2$.

The 10 percent aluminum phosphate addition listed in Table III also has high corrosion resistance.

It was found expedient to add the oxide of phosphorous to the pulverulent aluminum as the aluminum salt, $AlPO_4$, since powdered aluminum and powdered phosphorous pentoxide form a pyrophoric mixture which is inconvenient and dangerous to handle. Other phosphate salts may obviously be employed in order to obviate this difficulty.

While in the foregoing specific examples, set forth for the purpose of disclosing a working example of this invention, there has been disclosed particular materials and processing steps, it should be pointed out at this point that many variations of this process and the materials employed therein may be made which are within the skill of the art.

What we claim as new and desire to secure by Letters Patent of the United States is:

1. A coherent sintered metal-metal oxide body comprising a matrix consisting essentially of substantially pure aluminum and an oxide mixture consisting of 5 to 20 percent $SiO_2$ and 2 to 12 percent NiO distributed in fine particle form throughout said matrix.

2. A coherent sintered metal-metal oxide body comprising a matrix consisting essentially of substantially pure aluminum and an oxide mixture consisting of 5 to 10 percent $SiO_2$ and 2 to 5 percent NiO distributed in fine particle form throughout said matrix.

3. A coherent sintered metal-metal oxide body comprising a matrix consisting essentially of substantially pure aluminum and an oxide mixture consisting of 5 percent $SiO_2$ and 4 percent NiO distributed in fine particle form throughout said matrix.

4. A coherent sintered metal-metal oxide body comprising a matrix consisting essentially of substantially pure aluminum, from 5 to 20 percent $SiO_2$, and from 2 to 12 percent of an oxide selected from the group consisting of $Fe_2O_3$, NiO, CoO, $AlPO_4$ and mixtures thereof, said oxide being distributed in fine particle form throughout said matrix.

References Cited in the file of this patent

UNITED STATES PATENTS 2,840,891    Nachtman _____ July 1, 1958